Figure 4:
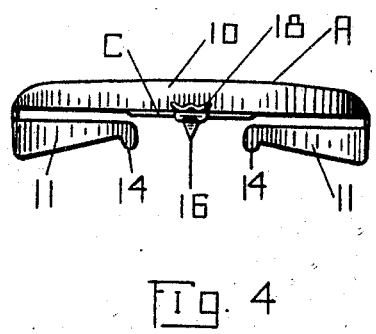

March 22, 1927.
C. T. RASCHICK
1,621,902
BOTTLE COVER AND CAP REMOVER
Filed Feb. 25, 1925　　2 Sheets-Sheet 1
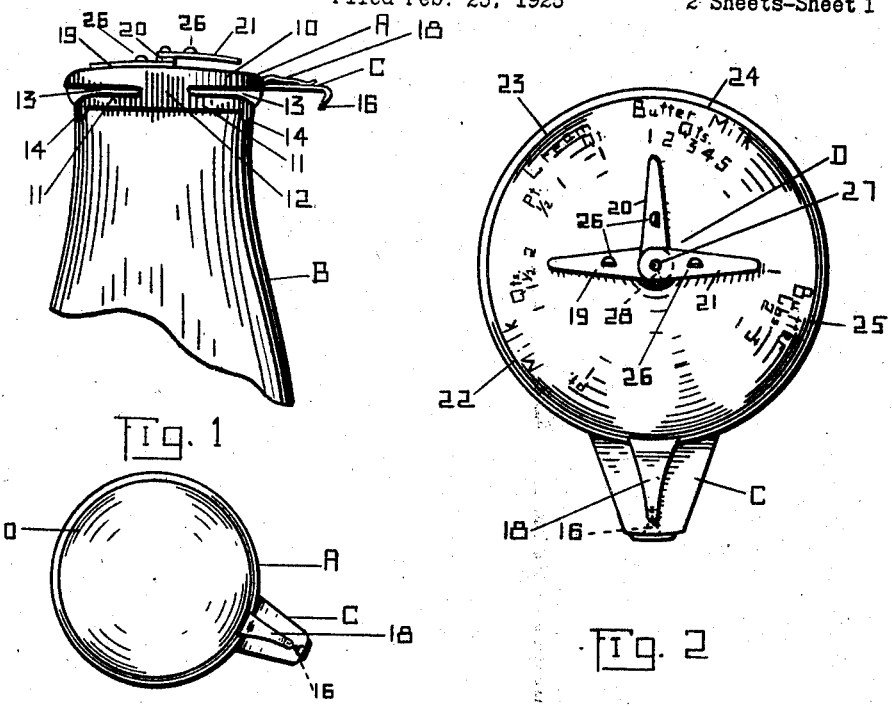
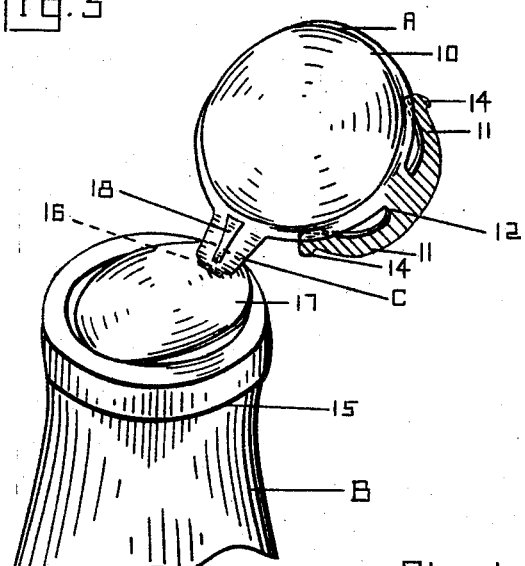
INVENTOR.
Charles T. Raschick
BY
ATTORNEY March 22, 1927.

C. T. RASCHICK 1,621,902

BOTTLE COVER AND CAP REMOVER

Filed Feb. 25, 1925

2 Sheets-Sheet 2

INVENTOR.
Charles T. Raschick
BY
ATTORNEY

Patented Mar. 22, 1927.

1,621,902

UNITED STATES PATENT OFFICE.

CHARLES T. RASCHICK, OF ST. PAUL, MINNESOTA.

BOTTLE COVER AND CAP REMOVER.

Application filed February 25, 1925. Serial No. 11,453.

My invention relates to bottle cover and cap removers which are particularly adapted to be used for a milk bottle, to provide a cover for the bottle when the paper cap is removed and to include in the cover a simple effective means of removing the paper cap.

It is also a feature of my invention to provide an indicating means which forms a part of my cover and which is adapted to indicate the different items which the housewife desires from the milk man. Thus obviating the necessity of making a separate memorandum and placing it with the empty milk bottle when the same is left for the milk man. The indicating means includes separate indicators which can be set to indicate different items as desired.

A further object of my invention resides in means for holding tickets to the bottle cover and cap remover in a convenient manner so that they can be collected by the milk man and to prevent the tickets from being scattered about or placed in the milk bottle, which ordinarily is damp inside. It is very annoying to the milk man to have the tickets placed in the damp or wet bottle as is usually done when the empty milk bottle is put out by the customer. My invention overcomes these difficulties and provides suitable means for indicating the order or holding tickets, a book of tickets, or a special order written out on a slip of paper and placed in the ticket holding means. The simple inexpensive construction of my bottle cover and cap remover is of primary importance.

It is also a feature of the invention to provide adjustable spring fingers which hold the cover onto the neck of the bottle. These fingers adjust themselves, owing to their spring nature, to the bottle neck and thus my cover is readily attached to different size milk bottles. The necks of the milk bottles vary and it is important that the cover be held snugly to the top so as to prevent the same from easy removal or falling off of the bottle.

Other objects and features of the invention will be more clearly pointed out and set forth in the following specification and claims.

Figure 7:
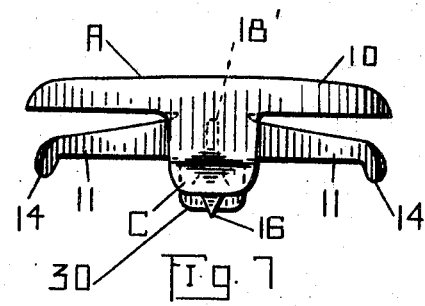
Figure 6:
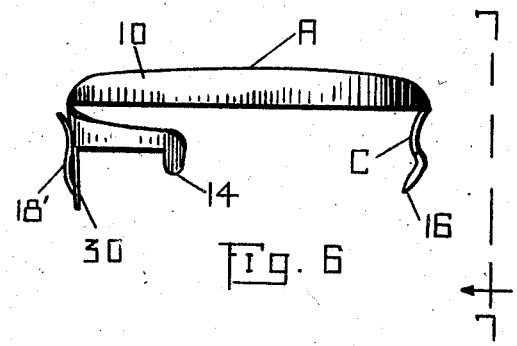
Figure 8:
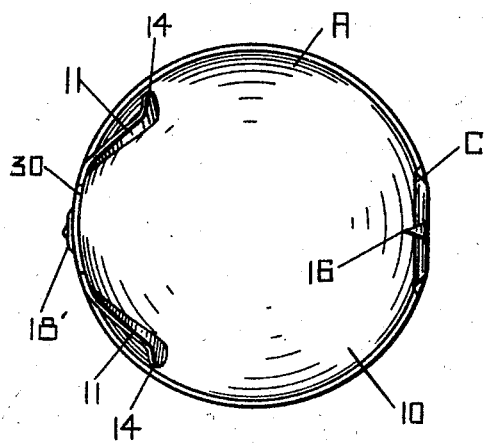

In the drawings forming a part of the specification,

Fig. 1 is a side elevation of my bottle cover and cap remover as it would appear in use and attached to a bottle neck, Fig. 2 is a plan view of the cover and cap remover, Fig. 3 is a bottom view of the same, Fig. 4 is a side view of the cover without the indicating fingers on the top of the same, Fig. 5 illustrates the cover illustrated in Fig. 4 in perspective as it would appear in removing the paper cap from a milk bottle, Fig. 6 is a side elevation of a modified construction of my cap, Fig. 7 is a side elevation on the line 7—7 of Fig. 6, and Fig. 8 is a bottom view of Fig. 6.

My milk bottle cover and cap remover A is formed from sheet material of any suitable nature and is provided with a body portion 10 forming the disk like cover which is adapted to extend over the opening of the bottle neck B. The body portion 10 curves to conform with the shape of the bottle neck around its periphery to fit snugly over the top of the bottle and form a closure for the same.

The cover A is provided with spring fingers 11 which are integrally connected at 12 to the body 10 of the cover. The spring fingers 11 extend below the body portion 10 and in a horizontal direction with a recess 13 between the free ends of the fingers and the body 10 of the cover. Each of the spring fingers 11 are formed with depending curved ends 14 which facilitate the easy attachment of the cover A to the milk bottle neck B. This construction permits the fingers 11 to extend along and engage the annular ridge 15 formed in the milk bottle neck below the upper edge of the same. The spring fingers are sufficiently resilient to adjust themselves to a considerable variation in size of milk bottle neck. The connecting portion 12 between the spring fingers 11 and the body 10 is sufficiently narrow to permit the fingers to flex in attaching themselves to the ridge of the neck of the bottle.

The cover A is provided with a cap removing finger C which extends from the body 10 of the cap and is formed with a pointed end 16 which pierces the paper cap 17 as illustrated in Fig. 5 of the drawings at a point close to the rim of the bottle neck and by pulling the cap A toward the operator. The pointed end 16 extends inwardly as illustrated in Fig. 1 in a manner so as to extend beneath the finger C and thus protect the point and the operator using the cover and cap remover.

A ticket holding means is formed by the spring finger 18 which is formed by cutting out a portion of the finger C and which extends along the same. This spring finger 18 forms a suitable engaging means to receive the milk tickets or coupons so that they can be attached to the cover A when the same is put out on an empty bottle so that the milk man can easily remove the same from the bottle cover.

My milk bottle cover A includes an indicating means D which is formed with indicating fingers 19, 20 and 21, while the cover or outer surface of the body 10 of the milk bottle cover and cap remover has printed thereon in any suitable manner indicia to indicate milk at 22, cream at 23, buttermilk at 24, butter at 25. Each of these items include numerals to indicate the amount to be ordered by the customer and the fingers 19, 20 and 21 can be set to indicate the amounts desired, as indicated in Fig. 2, of each of the items indicated and thus the milk man can see at a glance just what the customer wishes to order.

When any of the fingers 19, 20 and 21 are not desired for indication they are turned to a point opposite the indicia or a blank space on the surface of the cover 10. Obviously, a single finger such as 19 can be used to indicate just one item or it can be turned to any of the items provided only a single item is to be ordered while the other fingers are set at the blank position on the face of the dial of the cover A.

Each of the fingers 19, 20, and 21, is provided with detents 26 which project from the top surface of the fingers and prevent the same from being alined together directly one under the other. This construction permits the fingers to be turned with their free or indicating ends close together but prevents them from being positioned one directly above the other and thus permits the indicating fingers to be easily engaged and separated when desired. The indicating fingers 19, 20 and 21 are pivotally connected at 27 on the cover A and are secured together with sufficient frictional engagement so that the fingers will not freely rotate to move of themselves. This can be more readily accomplished by splitting the end of the finger 20 at 28 as indicated in Fig. 2 and thus forming a split washer like end positioned between the attached ends of the fingers 19 and 21.

The cap illustrated in Figs. 4 and 5 is not provided with an indicating dial means such as D but has a plain smooth top as indicated in the drawing. In this construction the memorandum for the milk man can be placed under the spring finger 18 with the tickets so as to indicate the customer's order.

The finger C can project horizontally from the body 10 of the cover A or it can be projected downwardly, as illustrated in the construction of Figs. 6 to 8 inclusive. The function of this form of the cap A is identical to that illustrated in Fig. 1. In the construction illustrated in Figs. 6, 7 and 8 only one set of fingers 11 is provided on one side of the cap A, the finger carrying the cap piercing point 16 extending downward, as illustrated in Fig. 6, to form the neck engaging member on that side of the cover A, thus obviating the necessity of the pair of fingers such as 11 on that side of the cap. In this construction the ticket holding finger 18' is cut and formed from the material extending between the free ends of the fingers 11 and by a broadened depending portion 30 which forms the connecting means, similar to the portion 12, which is adapted to connect the fingers 11 with the body 10 of the cap A.

This construction provides a cover A and cap remover formed from a single piece of sheet material which is of a very simple construction, including the bottle neck engaging fingers 11, the ticket holding finger 18' and the cap removing finger C with the piercing point 16. A cap of this nature fills a long felt want of the housewife as it provides the necessary utility to cover the bottle when the paper cap is removed including means for removing the cap and means for holding the tickets for the milk man so that they can be held collectively and in a convenient manner to be received by him. Thus my cover and cap remover forms a very convenient utility and permits it to be placed on an empty milk bottle with the tickets and the order. When the milk man removes the tickets he places the cover A on a full milk bottle so that it is always held in a convenient and practical way for use. The utility of my cover is readily apparent in its use and its simple inexpensive construction permits the same to be used in a very general and practical manner.

In accordance with the patent statutes I have described the principles of operation of my bottle cover and cap remover and while I have illustrated a particular formation and construction in the drawings, I desire to have it understood that these are only illustrative and that the invention can be carried out by other means and applied to other uses than those above set forth within the scope of the following claims.

I claim:

1. A bottle cover and cap remover including a cover body portion, spring fingers extending from said body portion, a cap removing finger extending from said body portion having a cap piercing point formed thereon, a ticket holding finger formed on said cap removing finger and indicating fingers associated with indicia on said body portion in a manner to permit the fingers to indicate the articles to be ordered by the customer by the setting of the fingers.

2. A milk bottle cover including a disk like cap portion adapted to form an indicating dial, indicating fingers pivotally secured to said dial, detents upon the top surface of said fingers and indicia to indicate various articles on said dial whereby the customer can set the indicating fingers to indicate the articles to be ordered from the milk man and said cover can be placed on the empty milk bottle.

3. A cover for milk bottles including flexible means for engaging the neck of said bottle, a cap removing finger and a ticket holding device formed on the upper surface of said cap removing finger.

CHARLES T. RASCHICK.